(No Model.) 2 Sheets—Sheet 1.
A. SHAMPAY.
CURTAIN AND SHADE STRETCHER.
No. 463,692. Patented Nov. 24, 1891.
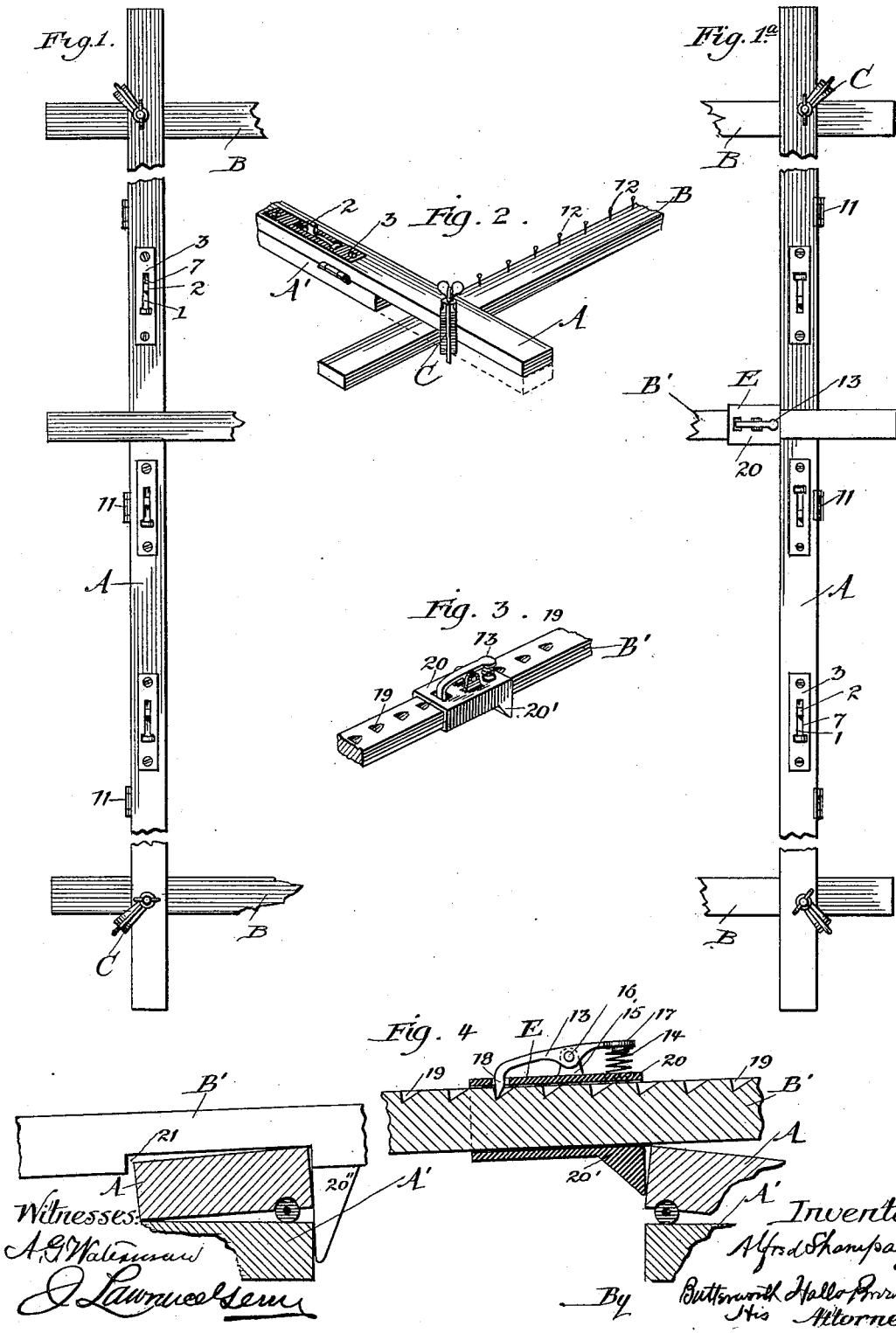

(No Model.) 2 Sheets—Sheet 2.
A. SHAMPAY.
CURTAIN AND SHADE STRETCHER.
No. 463,692. Patented Nov. 24, 1891.
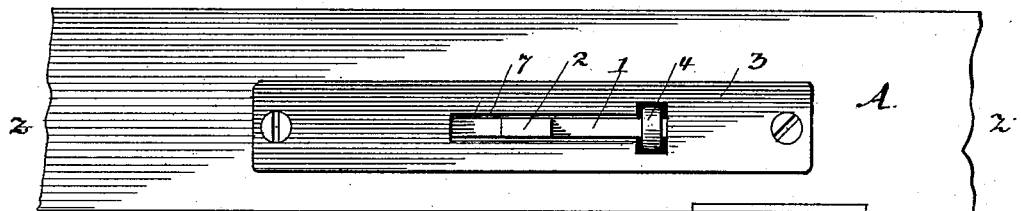
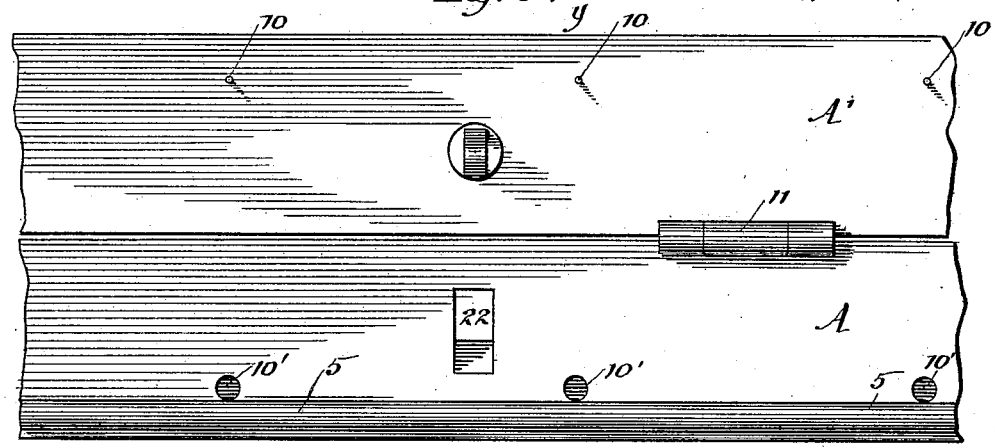
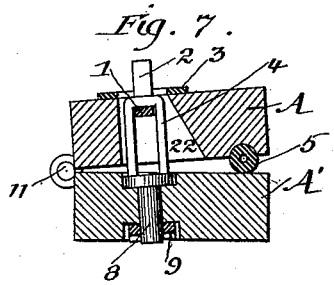
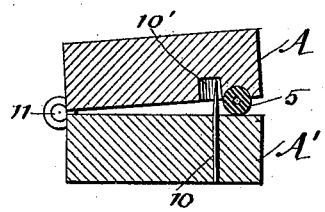
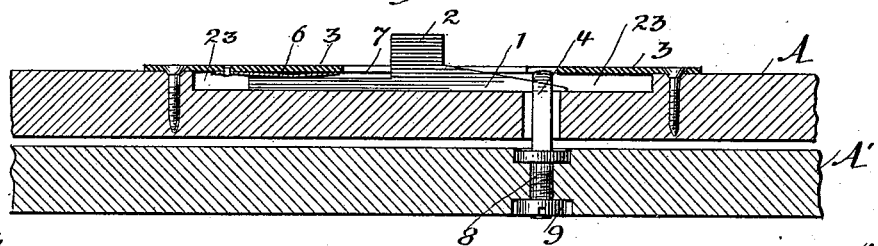
Witnesses:
Frank Blanchard
J. Lawrence Garry
Inventor:
Alfred Shampay
By Butterworth Hall & Brown
his Attorneys.
THE NORRIS PETERS CO., PHOTO-LITHO., WASHINGTON, D. C.

UNITED STATES PATENT OFFICE.

ALFRED SHAMPAY, OF CHICAGO, ILLINOIS.

CURTAIN AND SHADE STRETCHER.

SPECIFICATION forming part of Letters Patent No. 463,692, dated November 24, 1891.

Application filed December 27, 1890. Serial No. 376,003. (No model.)

*To all whom it may concern:*

Be it known that I, ALFRED SHAMPAY, a citizen of the United States, residing at Chicago, in the county of Cook and State of Illinois, have invented a new and useful Improvement in Lace-Curtain and Shade Stretchers, of which the following is a specification.

My invention relates to improvements in lace-curtain and shade stretchers; and the objects are to provide an adjustable frame upon which the material may be uniformly stretched, and means for retaining the edges of the material in the direction of the greatest force employed in stretching it without tearing or rents. I attain these objects by the mechanism illustrated in the accompanying drawings, in which—

Figure 1 represents one end of the frame, and Fig. 1ª the opposite end of said frame, the cross-bars which connect the same being shown partly broken away. Fig. 2 is a perspective view of a section or portion of two of the main slats or bars held in position by the clamp. Fig. 3 is a perspective view of a portion of the central cross bar or slat with its locking collar or slide. Fig. 4 is a sectional view of the central cross-bar with a portion cut away, showing its relation to the main bars of the frame. Fig. 5 is a top view of a portion of one of the main bars of the frame with one of the locking devices. Fig. 6 is a view of a portion of the main bar with its two parts spread open upon its hinges. Fig. 7 is a cross-sectional view of Fig. 5 upon the line $x$ $x$. Fig. 8 is a cross-sectional view of Fig. 6, when the two parts are closed, on the line $y$ $y$. Fig. 9 is a longitudinal sectional view of Fig. 5 on the line $z$ $z$.

Similar letters refer to similar parts throughout the several views.

The letters A A represent the two main bars constituting two ends of the frame.

B B represent the two cross-bars constituting the two sides of the frame.

B' represents a central cross-bar. The main bars A A rest above the cross-bars B B and are held together adjustably at the points of crossing by clamps C at each corner of the frame. The end bars are simply straight pieces of wooden slats or strips of proper width and thickness. The central cross-bar B' is of the same general form and construction, but provided with a locking-collar and other adjustable devices, as hereinafter explained. The main end bars A A are constructed of two strips or slats of wood A' A' of practically equal size and dimensions united by hinges upon one side placed along said strips at intervals of about every three feet, though these distances may be varied. By means of this arrangement the two strips or slats may be opened and closed from end to end, and are held firmly in line with each other by the hinges and the locking devices hereinafter described. In and along these hinged bars, at intervals of about one foot, are located and placed locking devices, as shown. This locking device has the following construction, though other forms may be employed without departing from the spirit of my invention: In the lower strip or slat A' are made holes or openings, as shown, in which are inserted and firmly located staples 4, 8, and 9. I have shown a staple 4, with a shank or bolt 8, and a head 9; but it is evident that any form of staple may be employed, so that it rises, as shown in Figs. 7 and 9, and is adjusted so as to receive the sliding key or pin 1 2. Of course simple two-pronged staples may be employed, the prongs being driven into the wood; but I prefer a form easily removable. In the upper part of slat A, at corresponding intervals, are cut mortise-openings of sufficient size and with inclined front surface to receive the staple freely when the upper and lower strips or slats are closed. In the upper surface of the upper strip or slat A is cut a groove or channel 23, the floor or bottom of which is somewhat lower than the upper opening of the staple 4. The depth and length of this groove or channel is such as to receive a slide pin or key 1 2, and give it room for longitudinal movement back and forth. This pin or key is constructed with a wedge-shaped front capable of entering and engaging the staple. A projection 2, to be used in moving the pin or key back and forth in the groove, and a shank extending behind it, over the groove or channel and the pin or key within it, is placed a plate of metal or other material 3, with a slot 7, which is firmly screwed down upon the upper surface of the slat or strip. This slot, enlarged at one end to enable the top of the staple to rise through it, enables the projection 2 to move back and forth. Between this plate and shank, and resting with its resiliency upon the shank of the pin or key, is a spring 3, which, pressing upon the shank, holds the pin or key in whatever position it is placed and prevents it from shifting or sliding, except when force is applied to it. Along the front interior edge or lip of the under strip or slat A' are placed firmly, at short intervals, pins 10, which, when the two strips or slats A A' are closed, extend into the openings 10', in the front interior edge or lip of the upper strip or slat. Along the front interior edge or lip of the upper strip or slat A is a rib 5, running longitudinally the whole length of A. This may be made integral with the strip or slat A, especially if made of soft and elastic wood or other material; but I prefer to cut a groove or channel in the strip or slat A, and insert a tube or strip of rubber or other elastic material. Such a tube or strip is shown at 5, Figs. 6, 7, and 8. The central cross-bar B' is provided with a locking-collar E at one or both ends. The collar is in the form of a sleeve that slides upon the bar or strip in which are cut a series of notches 19, extending from the ends inward. In a bracket located upon the upper surface of the collar is a pawl or catch 13, provided at its rear with a thumb-piece 17, supported upon a spring 14, resting against the collar, and at its front end 18 with a curved point passing through a slot in the collar and engaging in the notches 19. The collar is provided at its under side with a heel 20' to rest against the main end bars A A'. It is evident that instead of employing heels 20' 20'' to the collars they may be omitted and other devices may be used without departing from the principles of my invention. Thus a series of holes may be bored in the central cross-bar B' near its ends, and a pin or pins inserted in them, which will act as heels and rest against the inner edges of the main end bars A A, or a cleat or heel 22'', Fig. 4, with or without the depression 21, may be permanently attached to one end of the central cross-bar, and a locking-collar E used at the other end.

Having thus described the different parts of my invention and the mode of construction, I now proceed to explain its mode of operation. It will be understood that the material to be stretched is exceedingly frail and liable to have its threads broken and to be torn; but to be properly and uniformly stretched and restored to its proper shape requires the application of considerable force. Ordinarily the sides of the curtain or shade to be stretched are attached to the main bars A A. These bars are opened upon their respective hinges, Fig. 6, and the sides of the curtain are carefully fastened and hung upon the pins 10 10. The upper strip or slat A is then closed down upon the under strip A', and the strip or rib 5 at once impinges upon and holds the side of the curtain in a straight line across its entire length. With a hammer or mallet or other means the sliding wedges 1 2 are driven into their respective staples, clamping the curtain or shade tightly and firmly between the lower strip or slat A' and the strip or rib 5 in the upper strip or slat A. The curtain thus firmly held by the two main bars A A is stretched by moving these main bars in parallel lines upon the cross-bars B B away from each other, and at the proper time clamping them in place by the clamps. This stretching of the curtain or shade causes it to contract somewhat, and the lines of its ends to sag or curve inwardly from the cross-bars B B. To obviate this the main bars A A, which are somewhat flexible owing to their length, are compressed or bent inwardly at their centers, and the ends of the curtain or shade are carefully gathered and stretched toward the cross-bars B B and fastened to them by means of pins 12 12, Fig. 2. When this has been done, the compression upon the main bars A A is removed and the central cross-bar B' is applied at the respective centers of the main bars and by means of sufficient force and the sliding collar E the main bars A A are straightened and the curtain or shade is held and stretched uniformly. When this has been done and the curtain or shade is ready to be removed, the central bar B' is taken away, the slide pin or key 1 2 is drawn back out of engagement with the staple and is held out by the spring 6. It is evident, but for this spring impinging upon and holding the pin or key 1 2, there being a number of them on each main bar, the blows or force removing one or more would re-engage the others that had been loosened and obstruct the easy and quick opening of the two slats or strips A A'. Of course many other means for locking the two slats or strips A A' may be resorted to without departing from the spirit of my invention. They may be differently located and differ in form.

In using the central cross-bar B' its end may be rested against the interior edge of the main bar A, while the heel 20' of the sliding collar E may rest against the opposite main bar; or a depression 21 or a heel 20'', or both, may be employed at one end of the central cross-bar B' and a movable slide-collar at the other. In operating the slide-collar E pressure upon the thumb-piece 17 depresses it against the resiliency of the spring 14 and disengages its point 18 from the notches 19, and enables it to be freed and move forward, but left in normal condition as the slide moves backward, the catch automatically engages in the notches and holds the cross-bar B' at any given point.

Having thus described my invention, what I claim, and desire to secure by Letters Patent, is as follows:

1. In a curtain and shade stretching frame, the combination of two side cross-bars with two main end bars, the latter respectively constructed of two separate strips or parts hinged together at their sides, the lower part or strip of said main end bars being provided with pins or teeth and the upper part with a longitudinal strip or rib the whole length thereof for engaging and holding the material to be stretched, locking devices for holding the two parts or strips of said bars together, and means for holding the four parts of said frame together, all substantially as shown.

2. In a frame for stretching lace curtains and shades, the combination of two side crossbars with two main end bars, the latter respectively constructed of two strips or parts, one superimposed upon the other and hinged thereto, the lower part or strip provided with pins or teeth and the upper part or strip provided with a horizontal strip or rib for engaging and holding the material to be stretched, locking devices for holding and clamping the two parts of said bar together, a central crossbar provided with means for engaging the central portions of said main end bars and forcing them into straight lines, and means for holding the four parts of said frame in position, all substantially as shown.

3. In a frame for stretching lace curtains and shades, the combination of two side crossbars with two main end bars, the latter respectively constructed of two strips or parts hinged together at their sides, the upper strip or part provided with a longitudinal strip or rib for engaging and holding the material to be stretched, locking devices for clamping and holding said two parts together, and a central cross-bar provided with notches, and a locking-collar having a spring-catch engaging in said notches, all substantially as shown.

4. In a frame for stretching lace curtains and shades, a main end bar constructed of two parts hinged together, the lower part provided with pins or teeth and staples rising from its upper surface, the upper part provided with mortises or openings to receive said teeth and staples, also with a longitudinal strip to engage and hold the material to be stretched, and sliding pins or keys to engage with said staples and clamps to hold said two parts together, all substantially as shown.

5. In a frame for stretching lace curtains and shades, a main end bar constructed of two parts hinged together, the lower part provided with upwardly-projecting staples, the upper part provided with a longitudinal strip to engage and hold the material to be stretched and with mortises to receive said staples, and pins or keys to engage with said staples and to clamp and press said longitudinal strip firmly against said lower part, thereby holding said material to be stretched, all substantially as shown.

6. In a frame for stretching lace curtains and shades, a clamping device consisting of a staple, a wedge-shaped pin or key with a projecting back, and a shank, a spring pressing upon said shank, and a slotted plate to hold said spring and pin or key in place, all substantially as shown.

ALFRED SHAMPAY.

Witnesses:
LLEWELLYN C. MERRILL,
J. LAWRENCE GERRY.